Patented Mar. 19, 1946

2,396,744

UNITED STATES PATENT OFFICE 2,396,744

PROCESS OF PREPARING AN ALUMINUM SOAP FROM SPENT ALUMINUM HALIDE CATALYST AND A GREASE FROM SAID SOAP

Arnold J. Morway, Clark Township, Union County, N. J., assignor to Standard Oil Development Company, a corporation of Delaware No Drawing. Application August 4, 1942, Serial No. 453,554

10 Claims. (Cl. 252—35)

This invention relates to a method of preparing an aluminum soap made from a spent metal halide catalyst and to a method of utilizing this soap in the preparation of greases.

In many chemical processes metal halide catalysts are used but either during the chemical process are converted into organic complexes which separate out as a sludge, or else they are converted by hydrolysis by water, alcohol or an aqueous or alcoholic solution containing some caustic soda, into products which separate out as a sludge layer. In either case it is difficult or impossible to reconvert such spent metal halide sludge into suitable form for reusing as catalyst, except in a few instances where the catalyst complex also has some catalytic properties. Thus the lack of any practical recovery or by-product value of such spent metal halide catalyst has been a very substantial item in the cost of the chemical processes using such catalyst.

It is one object of the present invention to make available a practical method of using such spent metal halide catalyst in a novel manner which obtains unexpectedly useful results. Another object of the invention is to use such spent metal halide catalysts as a source of metal constituents for use as a substitute in place of new and pure metal compounds for the preparation of soaps and the soap constituents of other compositions containing a major proportion of hydrocarbon oil and a minor proportion of soap. These and other objects and advantages of the invention will appear more fully from the following description of the invention.

Broadly the invention comprises reacting a spent metal halide catalyst with an organic acid to produce a soap which is capable of use per se or in various compositions, particularly in combination with hydrocarbon oils, such as lubricating oils, or lighter fractions, such as gasoline.

The spent metal halide catalyst should preferably be one of the Friedel-Crafts type; aluminum chloride is particularly preferred. Although other catalysts, such as zinc chloride, ferric chloride, titanium tetrachloride, and stannic chloride may be used, it is preferred to use spent catalyst halides of metals having a valence of at least 3.

The various chemical processes in which such catalysts may be used are quite numerous and are well-known to organic chemists but a few are listed herewith as representative. Hydrocarbon conversion processes in which such catalysts are used include: (1) polymerization of unsaturated aliphatic hydrocarbons, such as olefins, e. g., ethylene, propylene, butylene, isobutylene, and higher olefins or mixed hydrocarbons, such as a $C_4$ cut from petroleum oils, diolefins, such as butadiene, chlorprene, etc., and copolymers, e. g., isobutylene-butadiene, especially as used in the manufacture of butyl rubber, styrene-butadiene, etc.; (2) condensation of aromatic hydrocarbons or condensible derivatives thereof together with aliphatic materials, such as olefins, as in the condensation of amylene with benzene or naphthalene, or with chlorinated hydrocarbons, as in the condensation of chlorinated wax with naphthalene, or with acyl halides, as in the condensation of stearyl chloride with naphthalene, or with unsaturated alcohols, as in the condensation of oleyl alcohol with naphthalene, etc.; (3) cracking of petroleum hydrocarbons, such as in the cracking of gas oil or lubricating oil fractions to produce lighter hydrocarbons of the gasoline boiling range; (4) isomerization, by which is meant the conversion of relatively low octane number hydrocarbons of the gasoline boiling range into compounds of a substantially similar boiling range but having a higher octane number; and (5) treating or refining of petroleum hydrocarbons of the various boiling ranges, such as lubricating oils, gasoline, kerosene, etc.

The organic acid to be reacted with the spent metal halide catalyst in accordance with this invention should preferably be a monobasic organic acid, and preferably still organic acids having more than 10 carbon atoms, such as the various fatty acids, e. g., stearic acid, oleic acid, synthetic acids produced by the oxidation of paraffin wax, naphthenic acids, such as those derived from kerosene and kerosene gas oil and other petroleum lubricating oil fractions, and various fatty acids obtained from various other natural fatty materials, such as hog fat, mutton tallow, beef stearin, cotton seed oil, castor oil, corn oil, various fish oils, etc. Although monobasic organic acids are preferred, it is possible in some instances to use dibasic or polybasic acids, such as oxalic, malonic, succinic, and others when it is desirable to add small amounts of these metal salts as inhibitors or modifiers. The same method of preparation may be used with the monobasic acids except that slightly higher temperatures are required.

In carrying out the invention, the preferred procedure is to add the spent metal halide catalyst to the organic acid, the latter being preferably in the liquid phase, i. e., as such, if normally liquid, and either molten or dissolved in an inert solvent if normally solid.

The mixture is then heated to a reaction temperature, generally between the approximate limits of 150° to 300° F. in order to drive off volatile reaction products, such as hydrogen chloride in the case of a spent metal chloride catalyst, and perhaps also some light hydrocarbon gases or vapors resulting from the liberation of hydrocarbon groups from the spent metal halide catalyst complex. When the saponification reaction is substantially complete, as will ordinarily be indicated by the cessation of the liberation of gases, the resultant soap which may have a darkened color should then be water washed, which will generally remove most, if not all, of the dark coloring, and then dried, such as by heating in an oven to a temperature of about 100° to 125° F., preferably within the narrower limits of 100° to 110° F., either alone or accompanied by the use of vacuum or blowing with air or suitable inert gas to assist in the removal of moisture.

The resulting soap will generally be found equal in lubricant forming properties to any of the commercial products. However by the above method, known quantities of metal may be combined with the fatty acids to give soaps of the desired quality or metal content. With commercial soap, particularly commercial aluminum stearate, there is a great variation in the percentage of free fatty acid in the soap products, which in turn affects the lubricant forming quality. Again commercial soap containing stoichiometrical amounts of metal are rare, particularly with the tri and tetra valent metals. By the above method, any desired metal content soap may be prepared and when used in lubricants, any desired quality obtained and maintained from batch to batch.

Aluminum soaps made specifically from a spent aluminum chloride catalyst will, for instance, generally have a higher melting point than soaps of similar aluminum content but made by other methods, i. e., from bauxite or aluminum oxide or hydroxide, which materials can obviously be better used for the manufacture of metallic aluminum, especially during the present wartime. The aluminum soaps of this invention are also ordinarily more soluble in, or more compatible with, petroleum hydrocarbon oils.

The soap made by thus reacting a spent metal halide catalyst with a monobasic organic acid may then be either marketed, stored and used as such for various industrial purposes or preferably, according to the present invention may be blended into a suitable hydrocarbon composition, such as for the preparation of the lubricating grease by blending into a mineral lubricating oil base stock. For manufacturing such greases the amount of aluminum soap to be used should normally be about 5 to 20% by weight of soap, the balance being essentially mineral lubricating oil alone or with minor amounts of other addition agents known to the art, such as anti-oxidants, dyes, viscosity or V. I. (viscosity index) improving agents, lubricity improvers, or load carrying agents, etc. In order to insure proper blending of the soap with the oil, it is generally desirable to heat the mixture to a suitable temperature such as about 280° to 350° F., preferably about 280° to 310° F., for aluminum soaps, with slight variations in the optimum blending temperature according to the type of organic acid being used and according to the type of spent metal catalyst being used for the saponification.

The resultant lubricating greases have unexpectedly good properties, such as low penetration, good color, smooth texture, etc.

Also, an important feature of this invention is that such lubricating greases can be prepared at much lower cost than has been heretofore possible by use of relatively pure compounds as raw materials.

The procedure of mixing the various materials either for the preparation of the soap or for the manufacture of lubricating grease, may be varied in various respects without departing from the broad principles of the invention. For instance, if it is desired to prepare a lubricating grease, the organic acid to be used may be dissolved directly in part or all of the mineral oil with suitable heating, and then the spent metal halide catalyst may be added directly to the resulting solution, with additional heating if and to such extent as necessary.

Also, if desired, the spent metal halide catalyst may be dissolved or suspended in part of the mineral oil to be used, the organic acid dissolved in another portion, or the balance of the mineral oil, and then the two resulting solutions mixed with suitable heating and agitation till saponification is complete.

The following example is given to illustrate the invention.

*Example*

Three gallons of polymer gasoline, made by polymerization of a petroleum $C_4$ cut (which contains substantial proportions of normal butylene, isobutylene and butadiene) was treated with 50 grams of aluminum chloride with agitation at room temperature for two days and then settled. A reddish brown sludge settled out on the bottom of the reatcion vessel. 25 grams of this wet sludge was added to 200 grams of melted hydrogenated fish oil (Hydrofol acid 51) and the temperature was raised to 200° F. A rapid evolution of hydrocarbon gases and hydrogen chloride occurred. After approximately ½ hour, no further HCl was given off. The resultant soap which was quite dark in color was washed with water several times, resulting in the almost complete removal of the dark color. The soap was dried in an oven at 180° F. and was blended with mineral oil in the following proportions:

| | Per cent |
|---|---|
| Aluminum soap (made as described above) | 9 |
| Medium naphthenic base lubricating oil (having a viscosity of 50 seconds Saybolt at 200° F.) | 36 |
| Heavy naphthenic base lubricating oil (having a viscosity of about 200 seconds Saybolt at 210° F.) | 55 |

The soap-oil blend was heated to 300° F. with stirring. When cooled, an excellent grease was produced which had an A. S. T. M. worked penetration of 275.

It is not intended that this invention be limited to any of the specific examples which have been given merely for the sake of illustration nor unnecessarily by any theory as to the mechanism of the operation of the invention, but only by the appended claims in which it is intended to claim all novelty inherent in the invention as well as other modifications coming within the scope and spirit of the invention.

I claim:

1. Process which comprises mixing an aluminum chloride catalyst spent in a hydrocarbon conversion process and consisting of an aluminum chloride-hydrocarbon complex, with a high molecular weight fatty acid, heating the mixture to about 200° F. until evolution of hydrogen chloride ceases, washing the resultant aluminum soap with water and drying said soap.

2. Process of manufacturing an aluminum base grease which comprises mixing an aluminum chloride catalyst spent in a hydrocarbon conversion process and consisting of an aluminum chloride-hydrocarbon complex, with a fatty acid having at least 10 carbon atoms, heating the resultant mixture to a reaction temperature of about 200° F. until the saponification reaction is substantially complete as indicated by the cessation of the hydrogen chloride liberation, washing the resultant soap with water, drying said soap, mixing the resultant soap with a mineral lubricating oil base stock in controlled proportions and heating said mixture to about 300° F. with stirring to produce a substantially homogeneous aluminum base grease.

3. Process which comprises reacting a high molecular weight monobasic organic acid at a temperature between 150° F. and 300° F. with a Friedel-Crafts type metal halide catalyst spent in a hydrocarbon conversion process and consisting of a hydrocarbon complex of a halide of a metal having a valence of at least 3 to produce a soap, and continuing the heating until evolution of hydrogen halide ceases, washing the reaction product with water and then drying the washed product.

4. Process which comprises mixing a high molecular weight monobasic organic acid with a Friedel-Crafts type metal halide catalyst spent in a hydrocarbon conversion process and consisting of a hydrocarbon complex of a halide of a metal having a valence of at least 3, and heating the mixture to a temperature between 150° F. and 300° F. until the saponification reaction is substantially complete as indicated by the cessation of the hydrogen halide liberation.

5. Process which comprises mixing a higher fatty acid with an aluminum chloride catalyst spent in a hydrocarbon conversion process and consisting of an aluminum chloride-hydrocarbon complex, and heating the mixture to about 200° F. until saponification is substantially complete as indicated by the cessation of the hydrogen chloride liberation, to produce an aluminum soap of said fatty acid.

6. The process which comprises reacting a high molecular weight monobasic organic acid at a temperature between 150° F. and 300° F. with a Friedel-Crafts type metal halide catalyst spent in a hydrocarbon conversion process and consisting of a hydrocarbon complex of a halide of a metal having a valence of at least 3, continuing the heating until evolution of hydrogen halide ceases to produce a soap, washing the soap with water, drying the washed soap and dispersing said soap in a lubricating oil in grease-making proportions.

7. The process of manufacturing a lubricating grease which comprises mixing a high molecular weight organic monobasic acid with a Friedel-Crafts type metal halide catalyst spent in a hydrocarbon conversion process and consisting of a hydrocarbon complex of a halide of a metal having a valence of at least 3, heating the mixture to reaction temperatures of between 150° F. and 300° F. until the reaction is substantially complete as indicated by a cessation of the hydrogen halide liberation and blending the resultant soap into a mineral lubricating oil base stock in amounts sufficient to produce a substantially homogeneous lubricating grease.

8. Process of manufacturing a lubricating grease which comprises dissolving a high molecular weight monobasic organic acid in a mineral lubricating oil base stock, adding thereto a sufficient amount of a Friedel-Crafts type metal halide catalyst spent in a hydrocarbon conversion process and consisting of a hydrocarbon complex of a halide of a metal having a valence of at least 3, to substantially completely saponify said organic acid, the soap formed being sufficient in amount to produce a grease, heating the resultant mixture to a temperature between 150° F. and 300° F. until said saponification reaction is substantially complete, and removing any residual hydrogen halide.

9. Process of manufacturing a lubricating grease which comprises dissolving a high molecular weight monobasic organic acid in a mineral lubricating oil base stock, adding thereto a sufficient amount of an aluminum chloride catalyst spent in a hydrocarbon conversion process and consisting of a hydrocarbon-aluminum chloride complex, to substantially completely saponify said organic acid, the soap formed being sufficient in amount to produce a grease, heating the resultant mixture to a temperature between 150° F. and 300° F. until said saponification reaction is substantially complete, and removing any residual hydrogen halide.

10. Process of manufacturing a lubricating grease which comprises mixing an aluminum chloride catalyst spent in a hydrocarbon conversion process and consisting of a hydrocarbon-aluminum chloride complex, with a mineral lubricating oil base stock, dissolving in the mixture a calculated amount of a high molecular weight monobasic organic acid to substantially completely saponify said organic acid, the soap formed being sufficient in amount to produce a grease, heating the resultant mixture to a temperature between 150° F. and 300° F. until said saponification reaction is substantially complete, and removing any residual hydrogen halide.

ARNOLD J. MORWAY.